United States Patent
Slabaugh et al.

(10) Patent No.: US 7,637,322 B2
(45) Date of Patent: Dec. 29, 2009

(54) METHODS AND COMPOSITIONS FOR ENHANCING GUAR HYDRATION RATES AND PERFORMING GUAR DERIVITIZATION REACTIONS

(75) Inventors: Billy F. Slabaugh, Duncan, OK (US); Robert E. Hanes, Jr., Oklahoma City, OK (US); Jimmie D. Weaver, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 164 days.

(21) Appl. No.: 11/035,305

(22) Filed: Jan. 13, 2005

(65) Prior Publication Data
US 2006/0151173 A1 Jul. 13, 2006

(51) Int. Cl.
*E21B 43/26* (2006.01)
(52) U.S. Cl. .................. 166/305.1; 166/308.1
(58) Field of Classification Search ............ 166/308.2, 166/305.1; 507/211, 904
See application file for complete search history.

(56) References Cited

U.S. PATENT DOCUMENTS

| | | | |
|---|---|---|---|
| 3,912,713 A | | 10/1975 | Boonstra, et al. |
| 4,269,975 A | | 5/1981 | Rutenberg et al. ........... 536/114 |
| 4,645,833 A | * | 2/1987 | Bayerlein et al. .......... 536/17.1 |
| 4,659,811 A | * | 4/1987 | Wu .............................. 536/114 |
| 4,959,464 A | * | 9/1990 | Yeh ............................ 536/114 |
| 6,387,853 B1 | * | 5/2002 | Dawson et al. .............. 507/211 |
| 2002/0052298 A1 | | 5/2002 | Chowdhary et al. |

FOREIGN PATENT DOCUMENTS

| | | |
|---|---|---|
| EP | 0 163 271 | 12/1985 |
| FR | 2 513 265 | 9/1982 |
| WO | WO 99/04027 | 1/1999 |

OTHER PUBLICATIONS

Foreign communication related to a counter part dated Apr. 27, 2006.

* cited by examiner

*Primary Examiner*—Jennfier H Gay
*Assistant Examiner*—Nicole A Coy
(74) *Attorney, Agent, or Firm*—Robert A. Kent; Baker Botts LLP

(57) ABSTRACT

One embodiment of the present invention provides a method of treating guar splits comprising exposing guar splits to a treatment chemical to create treated guar splits; and then, without first washing the treated guar splits, grinding the treated guar splits; and, then drying the ground, treated guar splits. Another embodiment of the present invention provides a method of treating a portion of a subterranean formation comprising providing a treatment fluid comprising a viscosifying agent wherein the viscosifying agent comprises ground, treated guar splits made by the following method: exposing guar splits to a treatment chemical to create treated guar splits; and then, without first washing the treated guar splits, grinding the treated guar splits; and, then drying the ground, treated guar splits; placing the treatment fluid into a portion of a subterranean formation.

11 Claims, No Drawings

METHODS AND COMPOSITIONS FOR ENHANCING GUAR HYDRATION RATES AND PERFORMING GUAR DERIVITIZATION REACTIONS

BACKGROUND OF THE INVENTION

The present invention relates to subterranean treatment fluids. More particularly, the present invention relates to methods and compositions for enhancing guar hydration rates and performing guar derivitization reactions.

Treatment fluids are used in a variety of operations and treatments performed in oil and gas wells. Such operations and treatments include, but are not limited to, production stimulation operations, such as fracturing, and well completion operations, such as hydraulic fracturing, gravel packing, and frac packing.

In hydraulic fracturing, a type of treatment fluid, referred to in the art as a fracturing fluid, is pumped through a well bore into a subterranean zone to be stimulated at a rate and pressure such that fractures are formed or enhanced in a desired subterranean zone. The fracturing fluid is generally a gel, emulsion, or foam that may comprise a particulate material often referred to as proppant. When used, proppant is deposited in the fracture and functions, inter alia, to hold the fracture open while maintaining conductive channels through which such produced fluids can flow upon completion of the fracturing treatment and release of the attendant hydraulic pressure.

Gravel packing treatments are used, inter alia, to reduce the migration of unconsolidated formation particulates into the well bore. In gravel packing operations, particulates, referred to in the art as gravel are suspended in a treatment fluid, which may be viscosified, and the treatment fluid is pumped into a well bore in which the gravel pack is to be placed. As the particulates are placed in the zone, the treatment fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel designed to prevent the passage of formation particulates through the pack with produced fluids, wherein the well bore may be oriented from vertical to horizontal and may extend from hundreds to thousands of feet.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

A variety of methods are used to create the viscosified treatment fluids typically used in subterranean operation. Generally, a polysaccharide or synthetic polymer gelling agent is used to impart viscosity to the treatment fluid to, among other things, enhance proppant or gravel transport and reduce fluid loss from the treatment fluid into the formation. Frequently, a crosslinking agent, such as a metal ion with organic or inorganic counteriion, organometallic or organic compound, is also added to further enhance the viscosity of the fluid by coupling, or "crosslinking," polymer molecules. The treatment fluid may also include one or more of a variety of well-known additives, such as gel stabilizers, fluid loss control agents, clay stabilizers, bactericides, and the like.

Guar gum and guar derivatives are commonly used in the oilfield to manufacture treatment fluids. Guar gum is typically prepared by mechanically and/or chemically treating guar beans to liberate the guar seed endosperm, or "guar splits," from the beans. Guar splits are primarily comprise a polymannose backbone with galactose side chains and mannose, and contain a fair concentration of contaminates, such as cellulose, protein, and glycolipids. The guar splits are generally treated under high pressures and temperatures with chemicals after which they are subjected to multiple washings to remove impurities and salts (which are byproducts of some of the treatments) from the splits. The treated and washed splits are then ground and dried to yield derivatized guars.

The guar powders are typically dispersed into a water-based fluid, such as a 2% KCl solution, and allowed time to hydrate. This dispersion may be accomplished by adding the powdered guar directly to water, or by first creating a liquid slurry, or liquid gel concentrate ("LGC"), of the powder in a non-hydrating solvent, such as diesel. After hydration, the guar fluid is significantly higher in viscosity, making it possible to transport high-density propping agents through pumping equipment and into a subterranean formation.

Despite their widespread use, guar-based treatment fluids do have some technical disadvantages. For example, the time necessary for complete hydration and/or viscosity generation for guar-based fluids may take several minutes. This can be particularly inconvenient during on-the-fly fracturing applications. In order to successfully use guar-based fluids in a continuous fashion requires the use of large volume (i.e., long residence time) holding tanks to permit the hydration of the guar gum. In addition to requiring additional equipment at the well site, this large holding volume limits the ability to change fluid formulations in response to real-time pressure changes that may be measured during the fracturing treatment. Even the derivatization of the guar can prove costly and/or inconvenient, as the derivatization process typically requires large reactors capable of handling dry materials to treat the guar splits, increasing the equipment expense necessary for creating the guar-based fluids.

SUMMARY OF THE INVENTION

The present invention relates to subterranean treatment fluids. More particularly, the present invention relates to methods and compositions for enhancing guar hydration rates and performing guar derivitization reactions.

One embodiment of the present invention provides a method of treating guar splits comprising exposing guar splits to a treatment chemical to create treated guar splits; and then, without first washing the treated guar splits, grinding the treated guar splits; and, then drying the ground, treated guar splits.

Another embodiment of the present invention provides a method of treating a portion of a subterranean formation comprising providing a treatment fluid comprising a viscosifying agent wherein the viscosifying agent comprises ground, treated guar splits made by the following method: exposing guar splits to a treatment chemical to create treated guar splits; and then, without first washing the treated guar splits, grinding the treated guar splits; and, then drying the ground, treated guar splits; placing the treatment fluid into a portion of a subterranean formation.

Another embodiment of the present invention provides a method of fracturing a portion of a subterranean formation comprising providing a treatment fluid comprising a viscosifying agent wherein the viscosifying agent comprises ground, treated guar splits made by the following method: exposing guar splits to a treatment chemical to create treated guar splits; and then, without first washing the treated guar splits, grinding the treated guar splits; and, then drying the ground, treated guar splits; placing the treatment fluid into a portion of a subterranean formation at a pressure sufficient to create or extend one or more fractures therein.

The features and advantages of the present invention will be readily apparent to those skilled in the art upon a reading of the description of the preferred embodiments that follows.

DESCRIPTION OF PREFERRED EMBODIMENTS

The present invention relates to subterranean treatment fluids. More particularly, the present invention relates to methods and compositions for enhancing guar hydration rates and performing guar derivitization reactions.

In accordance with the teachings of the present invention, guar splits are exposed to a treatment chemical and then ground and dried without the guar splits having been washed. Such exposure to treatment chemicals without subsequent washing may be used to enhance selected properties of the resulting guar gum. In some embodiments, the treatment chemical comprises a caustic solution; the use of such caustic solutions generally increases the hydration rate of guar powder made from the treated guar. In other embodiments, the treatment chemicals comprise a caustic solution in combination with a salt. In other embodiments, the treatment chemicals comprise a derivatizing agent that acts to derivatize the resultant ground, dried guar. In this fashion, the physical properties of the resulting guar gum may be tailored without the use of extensive treatments and/or large equipment expense.

Guar splits are typically produced by separating guar seed endosperms from guar beans. This may be accomplished using a number of mechanical and/or chemical treatments well known in the art. One of ordinary skill in the art, with the benefit of this disclosure, should be able to select an appropriate method of producing guar splits for use in accordance with the teachings of the present invention.

In particular embodiments of the present invention, the guar splits may be treated with a caustic solution to enhance the hydration rates of the resulting guar gum. Moreover, the addition of a caustic solution may make the guar powder more brittle and thus more easily ground. Suitable caustic solutions include, but are not limited to, sodium hydroxide, potassium hydroxide, and lithium hydroxide. Optionally, the guar splits may be treated with a salt, which may or may not be combined with the caustic solution. Suitable salt solutions include, but are not limited to, sodium chloride, potassium chloride, and lithium chloride, nitrates, and buffers such as acetates and carbonates. It is believed that the addition of a salt may act to enhance the solubility of the guar by providing an ionic potential solvating the salts and thus lowering the energy needed to hydrate the salts and speeding the hydration of the guar.

Contrary to common guar processing methods, after the guar splits have been treated with the caustic solution, the splits are not washed. Rather the treated splits are ground and dried with the caustic solution still on the splits. In addition to reducing the guar splits to a powder, the grinding action of the process also creates a number of open sites along the guar polymer. These sites are then free to react with the caustic solution.

In other embodiments of the present invention, the guar splits may be treated with a derivatizing agent to derivatize the guar. Generally, the choice of derivatizing agent may depend on the specific derivatization desired. Suitable derivatizing agents are electrophilic, organic compounds capable of reacting with open sites along a polymer. Such open sites may be formed, for example, when the guar splits are ground. In some embodiments, the derivatizing agent may include highly reactive compounds that are reactive to free radicals. Suitable derivatizing agents include, but are not limited to, derivatives of acrylic acid, cationic salts of acrylic acid, acrylic acid esters, and acrylic acid amides. Other suitable derivatizing agents include epoxides, lactones, sultones, oxaphospholanes, alkyl halides, derivatives of quinone (such as hydroquinone), triethanolamine, sodium bisulfite, and sodium thiosulfate. With the benefit of this disclosure, one skilled in the art will be aware of numerous other derivatizing agents suitable for use in the present invention.

Contrary to common guar processing methods, after the guar splits have been treated with a derivatizing agent, the splits are not washed. Rather the treated splits are ground and dried with the treatment chemical still on the splits. In addition to reducing the guar splits to a powder, the grinding action of the process also creates a number of open sites along the guar polymer. These sites are then free to react with the derivatizing compound as described above. In this fashion, chemical moieties can be grafted directly onto the polymer without the use of expensive reactor techniques.

Whether the chosen treatment chemical is a derivatizing agent or a caustic solution the treated guar splits are ground and dried following the treatment. In some embodiments, the splits may be ground in a hammermill or a pulverizer. The splits are commonly ground to a powder, generally to a size of less than about 100 mesh, U.S. Sieve Series. Generally the ground splits are then dried to a moisture content of less than about 20%. in some embodiments the ground splits are dried to a moisture content of less than about 12%. In some embodiments the ground splits are dried using known flash drying methods. As will be appreciated by one skilled in the art, a large number of variations may be affected in the grinding and drying of the guar splits without materially deviating from the scope and spirit of the present invention.

In particular embodiments, a treated guar gelling agent of the present invention may be used in a treatment fluid for use in a subterranean operation, such as fracturing or gravel packing. Such treatment fluids include aqueous gels, foams, and emulsions. The aqueous gels are generally comprised of water and one or more gelling agents. The emulsions may be comprised of two immiscible liquids such as an aqueous gelled liquid and a liquefied, normally gaseous fluid, such as nitrogen. In exemplary embodiments of the present invention, the treatment fluids are aqueous gels comprised of water, a treated guar gelling agent for gelling the water and increasing its viscosity, and, optionally, a crosslinking agent for crosslinking the gel and further increasing the viscosity of the fluid. The increased viscosity of the gelled, or gelled and crosslinked, treatment fluid, inter alia, reduces fluid loss and allows the treatment fluid to transport significant quantities of suspended particulates. The water used to form the treatment fluid may be fresh water, seawater, salt water, brine, or any other aqueous liquid that does not adversely react with the other components.

In addition to the treated guar gelling agents of the present invention, other gelling agents may be used to further viscosify the treatment fluids of the present invention. Suitable additional gelling agents include hydratable polymers that contain one or more functional groups such as hydroxyl, carboxyl, sulfate, sulfonate, amino, or amide groups. Particularly useful are polysaccharides and derivatives thereof that contain one or more of the monosaccharide units galactose, mannose, glucoside, glucose, xylose, arabinose, fructose, glucuronic acid, or pyranosyl sulfate. Examples of natural hydratable polymers containing the foregoing functional groups and units that are suitable for use in accordance with the present invention include, but are not limited to, guar, guar derivatives, hydroxypropyl guar, carboxymethyl guar, xanthan, chitosan, schleroglucan, succinoglycan, starch, biopolymers, and hydroxyethyl cellulose. Hydratable synthetic polymers and copolymers that contain the above-mentioned functional groups (e.g., hydroxyl, carboxyl, sulfate, sulfonate, amino, or amide groups) may also be used. Examples of such synthetic polymers include, but are not limited to, acrylamido-methyl-propane sulfonate ("AMPS"), polyacrylate, polymethacrylate, polyacrylamide, polyvinyl alcohol, and polyvinylpyrrolidone. Generally, these various hydratable polymers and copolymers contain functional groups that allow them to either hydrogen bond with themselves or adjacent polymers or copolymers, or to be crosslinked using an appropriate crosslinking agent.

In particular embodiments, the treatment fluids of the present invention may also include a crosslinking agent. Crosslinking agents typically comprise at least one ion that is capable of crosslinking at least two gelling agent molecules. Examples of suitable crosslinking agents include, but are not limited to, N,N'-methylenebisacrylamide, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinking agent is "CL-39" available from Halliburton Energy Services, Inc., Duncan Okla. Suitable crosslinking agents generally are present in the viscosified treatment fluids of the present invention in an amount sufficient to provide, inter alia, the desired degree of crosslinking between gelling agent molecules. In some embodiments of the present invention, the crosslinking agent may be present in an amount in the range from about 0.001% to about 10% by weight of the water in the treatment fluid. In some embodiments of the present invention, the crosslinking agent may be present in an amount in the range from about 0.01% to about 1% by weight of the water in the treatment fluid. Individuals skilled in the art, with the benefit of this disclosure, will recognize the exact type and amount of crosslinker to use depending on factors such as the specific gelling agent, desired viscosity, and formation conditions.

The gelled or gelled and crosslinked treatment fluids may also include internal delayed gel breakers such as enzyme, oxidizing, acid buffer, or temperature-activated gel breakers. The gel breakers cause the viscous treatment fluids to revert to relatively thin fluids that can be produced back to the surface after they have been used to, for example, place particulates in subterranean fractures. The gel breaker used is typically present in the treatment fluid in an amount in the range of from about 1% to about 5% by weight of the gelling agent. The treatment fluids may also include one or more of a variety of well-known additives, such as gel stabilizers, fluid loss control additives, clay stabilizers, bactericides, and the like.

Generally, the treatment fluids of the present invention are suitable for use in hydraulic fracturing, frac-packing, and gravel packing applications. In exemplary embodiments of the present invention where the treatment fluids are used to carry particulates, the particulates are generally of a size such that formation fines that may migrate with produced fluids are prevented from being produced from the subterranean zone. Any suitable particulate may be used, including graded sand, bauxite, ceramic materials, glass materials, walnut hulls, polymer beads, and the like. Generally, the particulates have a size in the range of from about 4 to about 400 mesh, U.S. Sieve Series. In some embodiments of the present invention, the particulates are graded sand having a particle size in the range of from about 10 to about 70 mesh, U.S. Sieve Series. In particular embodiments of the present invention, the particulates may be at least partially coated with a curable resin, tackifying agents, or some other flowback control agent or formation fine control agent.

To facilitate a better understanding of the present invention, the following examples of preferred embodiments are given. In no way should the following examples be read to limit or define the scope of the invention.

EXAMPLES

Example 1

The effect of various non-covalent additives was evaluated by adding to 200 grams of guar bean splits various additives as listed in Table 1. The mixtures as described in Table 1 were then heated at 150° F. in a roller oven for two hours and then ground with a pulvet grinder, then dehydrated in a vacuum oven to create dehydrated guar flour. Finally, the ground, dehydrated guar flour was stirred into 120 ML of tap water, and the viscosity was measured over time using a Brookfield viscometer (made by PVS, Middleboro, Mass.). The data clearly show that treating guar splits with additives can affect the viscosifying abilities of a resulting guar powder.

TABLE 1

| formula TIME | 200 g bean viscosity (cP) | control 120 cc dtw 200 g bean viscosity (cP) | 10 g urea 120 cc dtw 200 g bean viscosity (cP) | 20 g NaOH 16.95 g LiCl 120 cc dtw 200 g bean viscosity (cP) | 20 g NaOH 23.37 gNaCl 120 cc dtw 200 g bean viscosity (cP) | 20 g NaOH 30 g KCl 120 cc dtw 200 g bean viscosity (cP) | 30.85 g KOH 30 g KCl 120 cc dtw 200 g bean viscosity (cP) |
|---|---|---|---|---|---|---|---|
| 2  | 8.95  | 7.1   | 10.54 | 10.7  | 13.2  | 16.35 | 15.05 |
| 3  | 10.7  | 8.8   | 12.37 | 14.8  | 15.05 | 19.1  | 18.8  |
| 4  | 11.75 | 10.1  | 14.35 | 17.6  | 18.3  | 23.85 | 23.45 |
| 5  | 12.7  | 11.85 | 16.1  | 20.2  | 20.6  | 26.55 | 27.5  |
| 10 | 16.6  | 18.4  | 22.65 | 28    | 29.3  | 33.25 | 37.2  |
| 20 | 19.45 | 22.9  | 27.4  | 32.05 | 32.6  | 36.8  | 40.05 |
| 30 | 21.45 | 24.95 | 29.55 | 33.25 | 33.8  | 37.9  | 40.95 |
| 60 | 24.2  | 27.7  | 32.41 | 34.6  | 36.05 | 40.23 | 42.35 |

Example 2

To 100 g of guar bean splits was added 60 g of water, 10 g of NaOH, and 15 g of KCl. Then one of the following derivatizing agents was added: hydroquinone (0.5 g), triethanolamine (0.62 g), sodium bisulfite (0.5 g) and sodium thiosulfate (0.5 g). Two samples served as control using the same recipe with the exception of the addition of the derivatizing agent. These were identical with the exception of maintaining one in an oxygen free environment.

To correct for moisture weight, the samples were analyzed for water content. For hydration testing, the sample effective weight of polysaccharide was added to 250 mL of tap water, 5 g KCl, then the pH was adjusted to 7-7.5 at a temperature of 75-77° F. The change in viscosity versus time was measured until the change was constant. Two hours was arbitrarily chosen as a time where 100% hydration was attained. To correct for variations in particle sizes, the ground particles were sieved and particles retained on the same screen were used for the hydration study described in the above paragraph.

To verify the derivatizing agent had been covalently attached to the guar, the sample was subjected to continuous extraction using a Soxhlet apparatus and dichloromethane. Upon evaporation of the residue, the sample was found only to contain a trace amount of guar bean oil and no excess derivatizing agent or reaction derivatives. This result demonstrates the fate of the derivatizing agent necessarily had to have reacted with the guar.

The data clearly show that treating guar splits with additives can affect the viscosifying abilities of a resulting guar powder.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of treating a portion of a subterranean formation comprising:
    providing a treatment fluid comprising a viscosifying agent wherein the viscosifying agent comprises ground, treated guar splits made by the following method:
        exposing guar splits to a treatment chemical comprising a derivatizing agent that comprises at least one compound selected from the group consisting of: a cationic salt of acrylic acid, an acrylic acid ester, a lactone, a sultone, an oxaphospholane, a derivative of quinone, triethanolamine, sodium bisulfite, and sodium thiosulfate to create treated guar splits;
        exposing the guar splits and/or the treated guar splits to a salt solution that comprises at least one salt selected from the group consisting of: sodium chloride, potassium chloride, lithium chloride, and a nitrate; and then,
        grinding the treated guar splits without first washing the treated guar splits to create ground, treated guar splits; and then,
        drying the ground, treated guar splits; and
    placing the treatment fluid into a portion of a subterranean formation.

2. The method of claim 1 wherein the treatment chemical further comprises a caustic solution and wherein the caustic

TABLE 2

| formula TIME (min) | oxygen free control viscosity (cP) | control viscosity (cP) | hydroquinone viscosity (cP) | triethanolamine viscosity (cP) | sodium bisulfite viscosity (cP) | sodium thiosulfate viscosity (cP) |
|---|---|---|---|---|---|---|
| 2   | 8.4  | 6.2  | 5.2  | 8.2  | 6.7  | 7.4  |
| 3   | 10.9 | 8    | 6    | 8.9  | 9.2  | 8.3  |
| 4   | 12.5 | 9.4  | 6.8  | 9.6  | 10.8 | 8.7  |
| 5   | 13.9 | 10.7 | 7.2  | 9.9  | 12.2 | 9.7  |
| 10  | 17.5 | 15   | 8.4  | 10.8 | 15.9 | 10   |
| 20  | 19.1 | 16.5 | 9    | 11.2 | 17.5 | 10.2 |
| 30  | 19.8 | 17.2 | 9.5  | 11.4 | 18.2 | 10.2 |
| 60  | 20.1 | 17.7 | 9.8  | 11.6 | 18.5 | 10.2 |
| 120 | 20.9 | 18.9 | 10.4 | 11.6 | 18.6 | 10.4 | solution comprises at least one component selected from the group consisting of: sodium hydroxide, potassium hydroxide, and lithium hydroxide.

3. The method of claim 1 wherein during the step of grinding the treated guar splits, the treated guar splits are ground to a size of less than about 100 mesh, U.S. Sieve Series.

4. The method of claim 1 wherein during the step of drying the ground, treated guar splits, the ground, treated guar splits are dried to a moisture content of less than about 20%.

5. The method of claim 1 wherein the treatment fluid further comprises at least one crosslinking agent selected from the group consisting of: N,N'-methylenebisacrylamide, boric acid, disodium octaborate tetrahydrate, sodium diborate, a pentaborate, ulexite, colemanite, a compound that can supply zirconium IV ions, a compound that can supply titanium IV ions, an aluminum compound, an antimony compound, a chromium compound, an iron compound, a copper compound, and a zinc compound.

6. The method of claim 1 wherein the treatment fluid is placed into the subterranean formation at a pressure sufficient to create or extend one or more fractures therein.

7. A method of treating a portion of a subterranean formation comprising:
    providing a treatment fluid comprising a viscosifying agent wherein the viscosifying agent comprises ground, treated guar splits made by the following method:
        exposing guar splits to a salt solution comprising at least one salt selected from the group consisting of: sodium chloride, potassium chloride, lithium chloride, and a nitrate;
        exposing the guar splits to a derivatizing agent that comprises at least one compound selected from the group consisting of: a cationic salt of acrylic acid, an acrylic acid ester, a lactone, a sultone, an oxaphospholane, a derivative of quinone, triethanolamine, sodium bisulfite, and sodium thiosulfate to create treated guar splits; and then,
        grinding the treated guar splits without first washing the treated guar splits to create ground, treated guar splits; and then,
        drying the ground, treated guar splits; and
    placing the treatment fluid into a portion of a subterranean formation.

8. The method of claim 7 wherein the treatment fluid is placed into the subterranean formation at a pressure sufficient to create or extend one or more fractures therein.

9. The method of claim 7 wherein during the step of grinding the treated guar splits, the treated guar splits are ground to a size of less than about 100 mesh, U.S. Sieve Series.

10. The method of claim 7 wherein during the step of drying the ground, treated guar splits, the ground, treated guar splits are dried to a moisture content of less than about 20%.

11. The method of claim 7 wherein the treatment fluid further comprises at least one crosslinking agent selected from the group consisting of: N,N'-methylenebisacrylamide, boric acid, disodium octaborate tetrahydrate, sodium diborate, a pentaborate, ulexite, colemanite, a compound that can supply zirconium IV ions, a compound that can supply titanium IV ions, an aluminum compound, an antimony compound, a chromium compound, an iron compound, a copper compound, and a zinc compound.

* * * * *